US006939081B1

(12) United States Patent
Gropp

(10) Patent No.: US 6,939,081 B1
(45) Date of Patent: Sep. 6, 2005

(54) FUEL DISPENSING AND CONTAINMENT ASSEMBLY

(76) Inventor: Steven M. Gropp, 780 Cottonwood St., Corona, CA (US) 92879

( * ) Notice: Subject to any disclaimer, the term of this patent is extended or adjusted under 35 U.S.C. 154(b) by 21 days.

(21) Appl. No.: 10/682,213

(22) Filed: Oct. 8, 2003

Related U.S. Application Data

(63) Continuation of application No. 10/078,575, filed on Feb. 20, 2002, now abandoned.

(30) Foreign Application Priority Data

Oct. 10, 2002 (DE) ................................ 102 47 230

(51) Int. Cl.[7] ................................................ B65G 5/00

(52) U.S. Cl. .......................... 405/53; 405/52; 137/312; 220/567.2

(58) Field of Search .............................. 405/52, 53, 55, 405/59, 129.1, 129.35, 129.45, 129.5, 129.55, 405/129.57; 137/264, 312, 364, 342; 220/567.1, 220/571, 567.2

(56) References Cited

U.S. PATENT DOCUMENTS

| | | | | | |
|---|---|---|---|---|---|
| 4,653,958 | A | * | 3/1987 | Anderson et al. | 405/157 |
| 4,778,310 | A | * | 10/1988 | Moreland | 405/270 |
| 4,934,866 | A | * | 6/1990 | Gage | 450/54 |
| 4,968,179 | A | * | 11/1990 | Frahm | 405/53 |
| 4,978,249 | A | * | 12/1990 | Killman | 405/303 |
| 5,030,033 | A | * | 7/1991 | Heintzelman et al. | 405/129.57 |
| 5,037,239 | A | * | 8/1991 | Olsen et al. | 405/129.55 |
| 5,244,307 | A | * | 9/1993 | Wokas | 405/53 |
| 5,299,709 | A | * | 4/1994 | Beerbower et al. | 137/356 |
| 5,421,671 | A | * | 6/1995 | Lewis | 405/52 |
| 5,570,805 | A | * | 11/1996 | Harding | 220/567.2 |
| 5,573,348 | A | * | 11/1996 | Morgan | 405/52 |
| 5,582,310 | A | * | 12/1996 | Del Zotto | 220/571 |
| 5,769,109 | A | * | 6/1998 | Stanton et al. | 220/571 |
| 5,833,390 | A | * | 11/1998 | Lovett | 405/52 |

(Continued)

FOREIGN PATENT DOCUMENTS

| | | | | |
|---|---|---|---|---|
| GB | 2234544 | * | 7/1991 | 405/53 |

*Primary Examiner*—Jong-Suck (James) Lee
(74) *Attorney, Agent, or Firm*—Edgar W. Averill, Jr.

(57) ABSTRACT

A modular fuel dispensing and containment assembly for storing fuel in at least one fuel tank and for pumping the fuel to a group of fuel dispensers. The assembly has a reinforced concrete vault located underground which contains a fuel tank within its interior. The fuel tank is separated from the interior walls of the vault. The fuel tank has a turbine corridor on its lid, which corridor has an interior volume which leads from the fuel tank to a series of piping corridors. The turbine corridor and the piping corridors are all underground and the piping corridors lead to dispensing modules which are located under the dispensers or gas pumps. The dispenser modules and piping corridors are all sufficiently large to permit the entry of service personnel to their interiors. The interiors of the various corridors and modules form a single interconnected air volume. The result is a fuel dispensing and containment assembly wherein the vault and corridors and dispensing modules act as a secondary containment against any contaminant leaking from the primary piping or tanks. It also permits complete visual inspection of the primary containment and physical access to all its parts at any time.

16 Claims, 4 Drawing Sheets

U.S. PATENT DOCUMENTS

| | | | | |
|---|---|---|---|---|
| 5,881,760 | A * | 3/1999 | Del Zotto | 137/312 |
| 6,116,815 | A * | 9/2000 | Chen | 405/52 |
| 6,169,761 | B1 * | 1/2001 | Marcoccia et al. | 375/132 |
| 6,196,761 | B1 | 3/2001 | Stanton et al. | |
| 6,340,269 | B1 * | 1/2002 | Stanton et al. | 405/53 |
| 6,514,009 | B2 * | 2/2003 | Northcott et al. | 405/53 |
| 6,637,976 | B2 * | 10/2003 | Stanton | 405/53 |

* cited by examiner 3
3
11
12
13
14
16
17
18
19
20
21
22
23
23A
24
25
26
27
28
29
30
31
32
33
34
35
36
37
38
40
41
42
43
44
46
47
48
49
50
51
52

FUEL DISPENSING AND CONTAINMENT ASSEMBLY

CROSS REFERENCE TO RELATED APPLICATIONS

This application is a continuation of applicant's application Ser. No. 10/078,575, filed Feb. 20, 2002, abandoned.

BACKGROUND OF THE INVENTION

The field of the invention is fuel dispensing and containment systems and the invention relates more particularly to systems which utilize a fuel tank which is held in an underground concrete vault. The vast majority of "gas stations" utilize fuel storage tanks which are buried directly underground. Years ago, there was a lack of appreciation of the negative consequences of fuel leaking from the underground tank and associated piping into the ground. With the present enlightened ecological sensitivity, vast amounts of money are spent to try to remove all fuel which might have leaked from such storage tanks and piping into the surrounding ground water table. Various funds have been established to help finance such cleanup procedures and a per-gallon charge is levied against dispensed fuel to create the necessary funds for cleanup. If the fuel is stored in a tank above ground, such surcharge is not levied, since there is essentially no possibility of fuel passing from the tank or its attendant piping to an underground location.

Various vaults containing tanks have been designed. One such system is shown in U.S. Pat. No. 4,978,249, where two tanks are shown in a segmented vault which has a top mounted at ground level. A pipe chase abuts one side of the tank and also has a top at ground level.

U.S. Pat. No. 5,244,307 shows a fuel dispensing system where the fuel storage tank is positioned directly under the dispensers. The piping is located above grade level.

An above-grade storage vault is shown in U.S. Pat. No. 5,582,310 where a steel storage tank is maintained within a concrete vault.

U.S. Pat. No. 5,769,109 utilizes a concrete vault to provide overflow containment in the event of any fuel leak.

U.S. Pat. No. 6,196,761 shows an underground storage vault also located directly under the dispensers. Also, only one end of the tank is available for visual inspection.

BRIEF SUMMARY OF THE INVENTION

It is an object of the present invention to provide a modular fuel dispensing and containment assembly which utilizes a fuel tank held within a reinforced concrete vault which is located underground. In conjunction with the vault, a manifold of corridors is also located underground and leads to a plurality of dispensing modules. The interior of the corridors and dispensing modules form a single interconnected air volume and the tank and piping are all retained within liquid impermeable containment structures.

The present invention is for a modular fuel dispensing and containment system for storing fuel and at least one fuel tank and pumping the fuel to a plurality of fuel dispensers at locations remote from the fuel tank. The system has a reinforced vault located underground, which vault has a floor, side walls and a top supporting a lid. A fuel tank is held within the reinforced concrete vault and is separated from one or more of the walls a sufficient distance to permit a person to enter an interior of the vault for inspection purposes. A turbine corridor is preferably positioned with its bottom contacting the lid of the vault. The turbine corridor is positioned over an area of the fuel tank where the fuel filling and outlet lines communicate with the fuel tank, and although the turbine corridor is positioned above the vault, it is also underground. A plurality of piping corridors are sealingly affixed over an end of the turbine corridor and are also underground and fluid tight, and have an interior area sufficiently large to allow personnel to enter. A series of dispensing modules are sealed over containment structures past an exit end of a piping corridor and the dispensing module also has an interior volume sufficiently large for entrance of service personnel. The interior of the turbine corridor and piping corridors and dispensing module form a single connected air volume.

DESCRIPTION OF THE PREFERRED EMBODIMENTS

Figure 1:
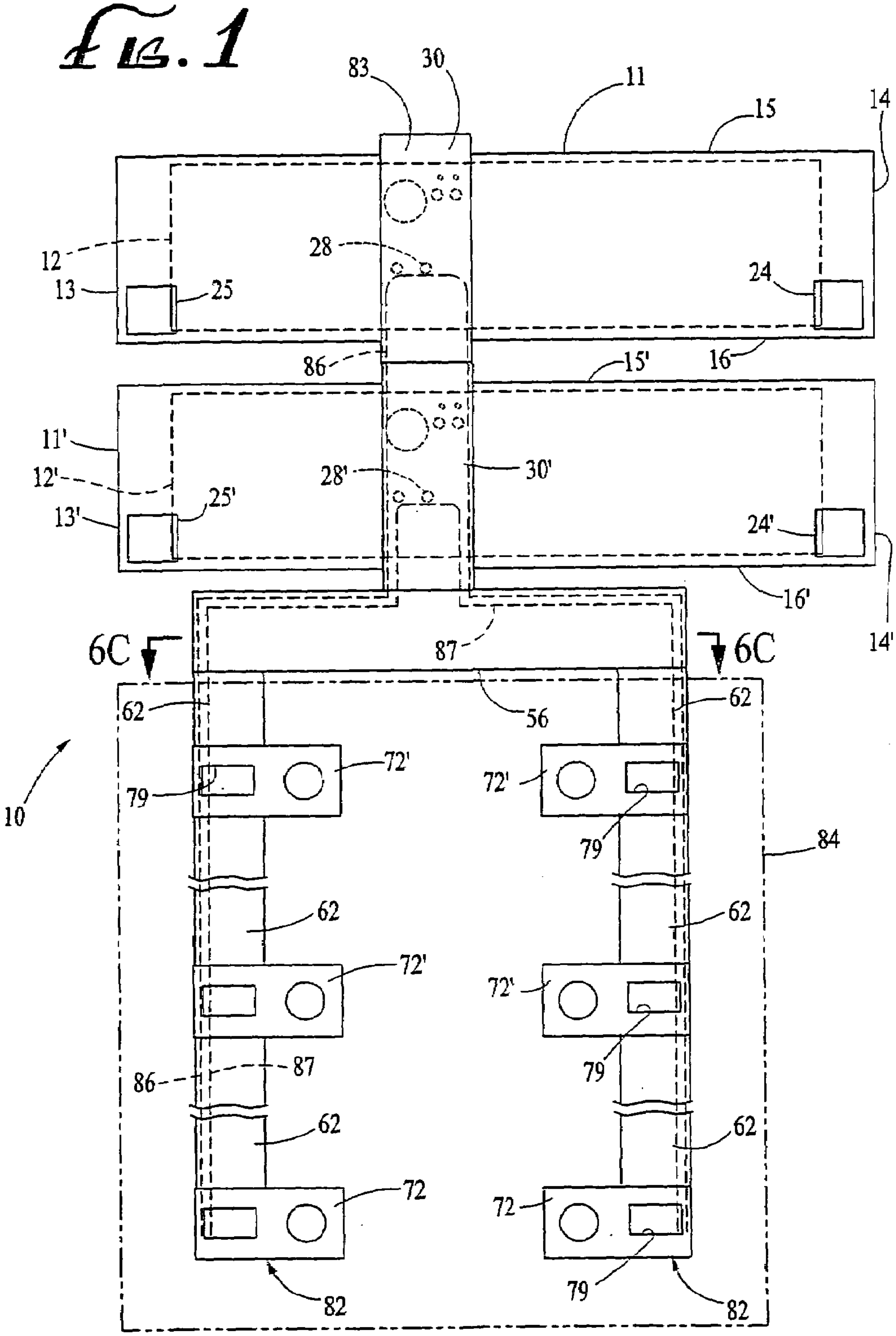
FIG. 1 is a diagrammatic plan view of the modular fuel dispensing and containment system of the present invention.
Figures 2, 3, 4, 5:
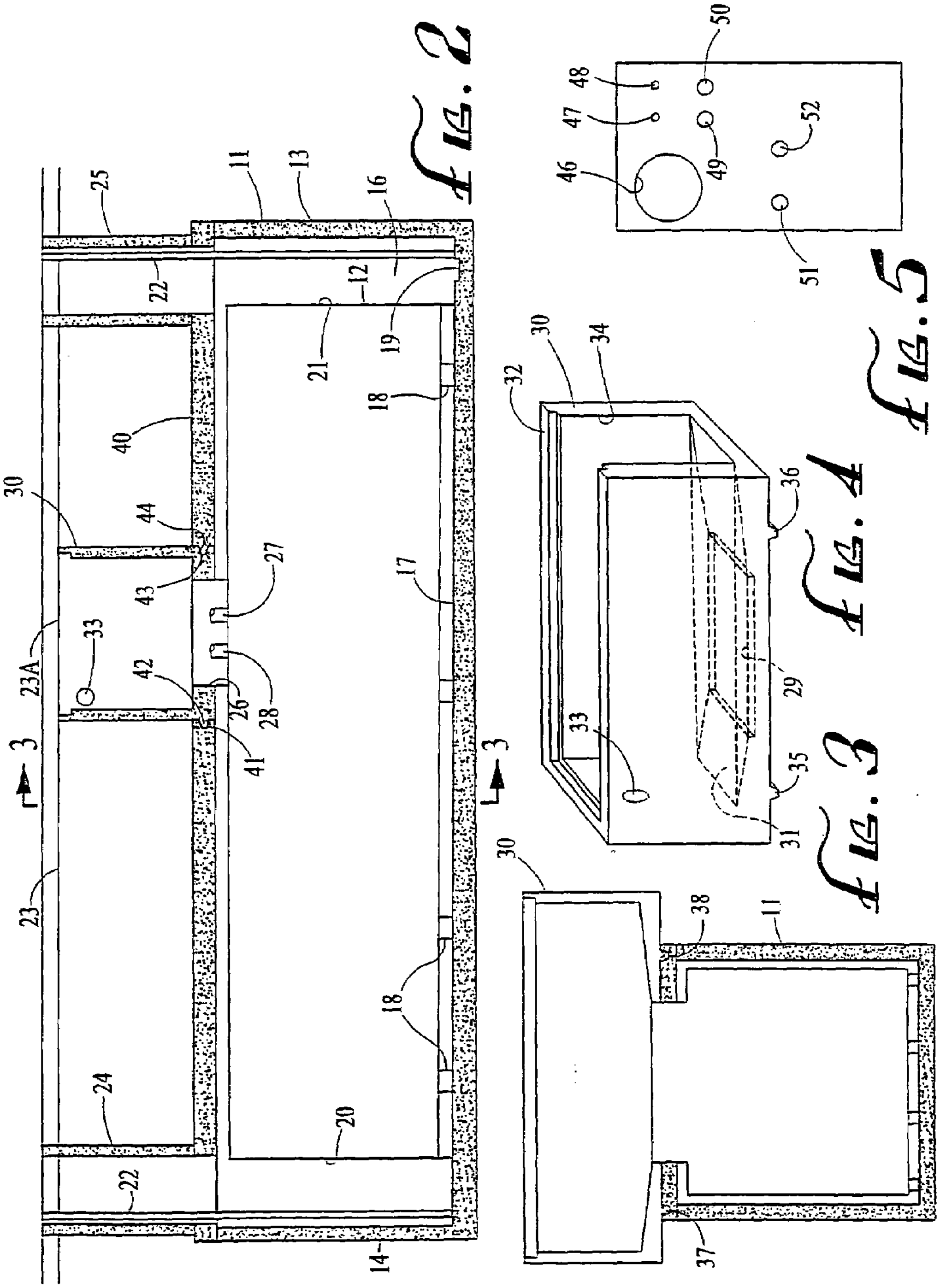
FIG. 2 is a cross-sectional view of the reinforced vault and steel storage tank of FIG. 1.
FIG. 3 is a cross-sectional view taken along line 3—3 of FIG. 2.
FIG. 4 is a perspective view of the turbine corridor of FIG. 1.
FIG. 5 is a plan view of a turbine sump at the tank 11 collar in the turbine corridor of FIG. 4.

A plan diagrammatic view of the modular fuel dispensing and containment assembly of the present invention is shown in FIG. 1 and indicated generally by reference character 10. Assembly 10 has a first reinforced concrete vault 11 which contains a first fuel tank 12 shown in phantom view. Vault 11 has a first end wall 13, a second end wall 14, a first side wall 15, and a second side wall 16. As shown in FIG. 2, vault 11 has a floor 17 and fuel tank 12 is supported above floor 17 a distance, such as 4", by a plurality of legs 18. Floor 17 is sloped toward a leak collection monitoring sump 19.

Tank 12 has a first end wall 20 and a second end wall 21. Both end walls are preferably spaced from their respective vault end walls a distance sufficient to permit service personnel to enter the vault and physically observe fuel tank 12. A 30" spacing has been found sufficient for this purpose and separately installed ladder unit 22 is provided in the end walls to assist in the entry into the inner volume of vault 11.

The finished slab ground level is indicated by reference character 23 and a pair of turrets 24 and 25 extend upwardly from the vault and permit access to the interior of the vault from the ground level. The top of the turrets 24 and 25, as well as the top of a turbine corridor 30, are indicated by reference character 23A and are typically 6" below the top of the finished slab 23.

Fuel tank 12 has a fuel tank turbine collar 26 which is a rectangular wall which extends upwardly from the flat top surface of the tank and surrounds various connections to the tank, including a fuel filler line 27 and a fuel outlet line 28. Fuel tank turbine collar 26 is sealed to tank access opening 29, as shown in FIG. 4, in the bottom of the floor in turbine corridor 30. Turbine corridor 30 has an 8" thick floor 31 which is sloped to tank access opening 29. Turbine corridor 30 has a top edge 32 which is cast to receive a metal decking, such as that sold under the trademark "Verco." A poured deck is located above the metal decking to finish the concrete to finished grade.

The turbine corridor contemplated for use with a 15,000 gallon steel fuel tank is be 11' long, 6' high, and 5' wide. It has an opening 33 for connection to an air circulation system. A connection passageway 34 is formed at the other end for connection to either a second turbine corridor or to a piping interconnect corridor.

The turbine corridor/passageway has a pair of male keys 35 and 36 which fit into female keyways 37 and 38 formed along the entire top of reinforced concrete vault 11. Two lid sections, namely a longer lid section 39 and a shorter lid section 40, complete the cover for vault 11. Lid section 39 has a female keyway 41 which mates with a male keyway 42 on turbine corridor 30. Similarly, lid section 40 has a male keyway 43 which mates with a female keyway 44 formed in the side of turbine corridor 30. The result is the ability to seal the three portions of the lid over vault 11 so that it is watertight. The bottom and side walls are integrally cast and are inherently watertight. Also, the exterior surface interior with a sealer/epoxy to provide still further assurance against the passage of liquid through the reinforced vault walls.

Turbine corridor 30 has a sump 45, shown in FIG. 5, which includes a 24" manhole opening 46, an opening 47 for a 2" vent, and a 2" opening 48 for a monitor. It also has a vapor return opening 49 sized for a 4" pipe, a spare 4" opening 50, an emergency vent 51 and a 4" opening for a pump 52, A second fuel tank 12' is held in second reinforced concrete vault 11'. It is identified with the same reference characters, with the addition of a prime, as those associated with vault 11.

Figure 8:
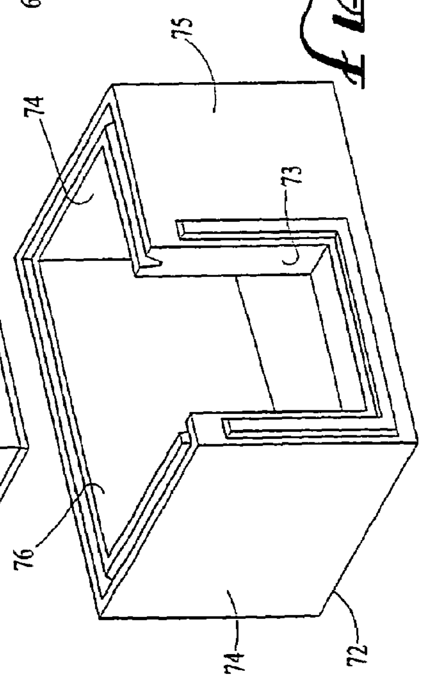
FIG. 8 is a perspective view of a dispensing module of FIG. 1.
Figure 7:
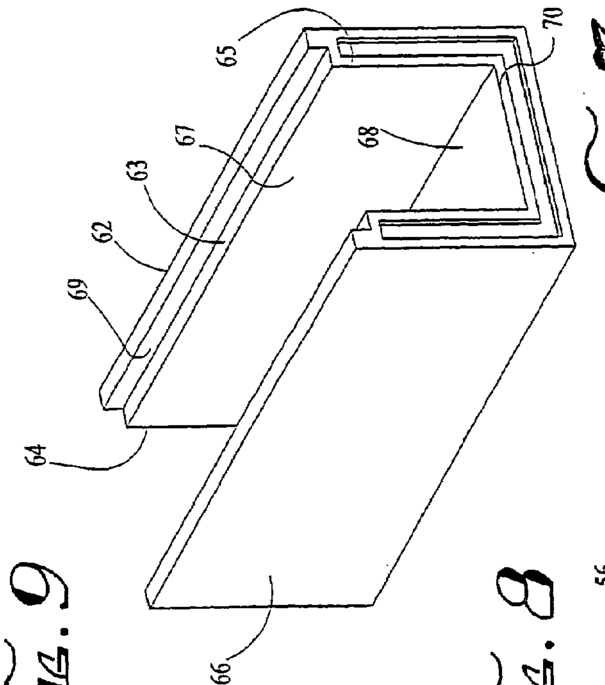
FIG. 7 is a perspective view of a piping corridor of FIG. 1.
Figure 6A:
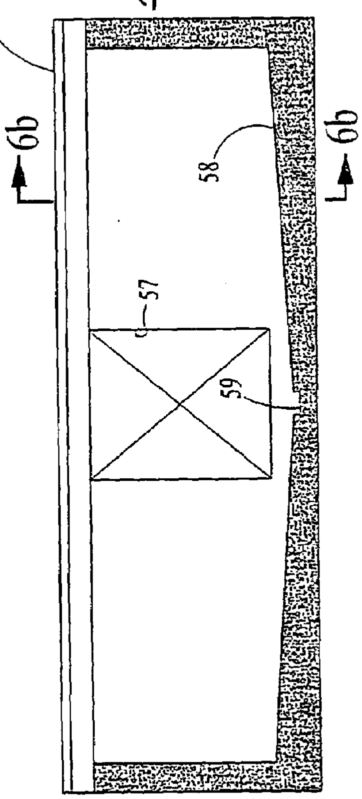
FIG. 6A is a cross-sectional view of the piping interconnect corridor of FIG. 1.
Figure 6B:
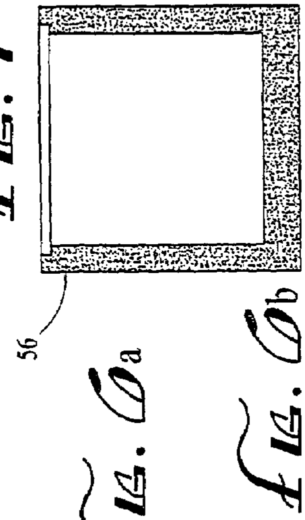
FIG. 6B is an end view of the piping interconnect corridor of FIG. 6A.
Figure 6C:
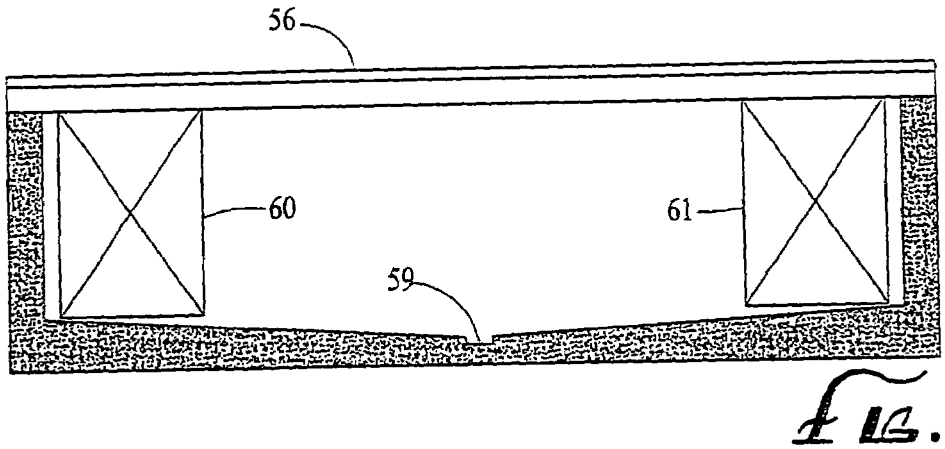
FIG. 6C is a cross-sectional view of the piping interconnect corridor of FIG. 6A.

Turbine corridor 30' connects with piping interconnect corridor 56, shown in cross-sectional view in FIG. 6A and in schematic view in FIG. 1. Piping interconnect corridor 56 has a 4'×5; opening 57 for connection to turbine corridor 30'. The top of interconnect corridor 56 is cast to receive decking of the type sole under the trademark "Verco" and is underground, and supports a poured-in-place concrete slab to finish grade. Interconnect corridor 56 has a bottom 58 which slopes to a collection monitoring sump 59. Turbine corridor 30' is keyed and belted to opening 57 to provide a liquid-tight connection. A cross-sectional view taken along line 6B—6B of FIG. 6A is shown in FIG. 6B. A cross-sectional view taken along line 6C—6C of FIG. 1 is shown in FIG. 6C. A pair of 3'×5' corridor openings are provided for connection to piping corridors/passageways, such as piping corridor 62 shown in FIG. 7. Piping corridor 62 is also cast to have a top step 63 which is cast to receive decking of the type sold under the trademark "Verco." Corridor 62 has a supply end 64 and ana exit end 65. The side walls 66 and 67 are integrally cast with floor 68 to provide a leak-proof structure. Supply end 64 has a make keyway and exit end 65 has a female keyway 70. In this way, one or more piping corridors can be plugged together to help conform the overall system to the site available. The piping corridor 61 is 4' wide and is 5'6" high and 8' long. It is, thus, large enough for the entry of personnel to physically observe piping within the corridor. Piping corridor 62 is sealingly connected to a dispenser module 72, shown in FIG. 8. Dispenser module 72 has a 3'×5' opening 73, which is sealed into exit end 65 of piping corridor 62. Dispenser module 72 has side walls 74, entrance wall 75, and rear wall 76 forming a dispenser module passageway. Dispenser module 72 is shown as an end module. If it were an intermediate module such as dispenser 72', it would have an opening 73 in rear wall 76.

Figure 9:
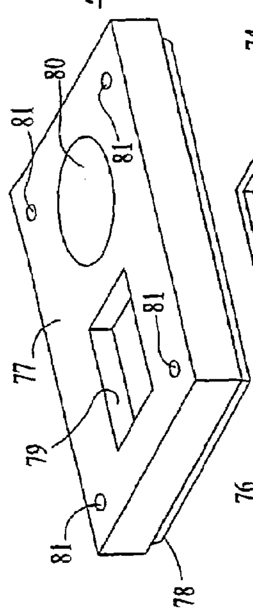
FIG. 9 is a perspective view of a cover for the dispensing module of FIG. 8.

A lid 77 is shown in FIG. 9 and covers the fuel dispenser island. Lid 77 is keyed into keyway 78 to provide a leak proof seal with module 72. Lid 77 has a universal template 79 fabricated from a welded frame designed to fit the buyer-determined dispenser monitoring pan. A 30" round pedestrian-rated access door 80 permits entry to the interior of module 72. Four pilot holes 81 permit the insertion of bolts to permit the lifting and lowering of the cover 77 into place. Receivers in the top of the dispenser module lid allow for the leveling of the lid with thru bolts, since it is important that the dispenser be mounted on a horizontal-base.

The result of the provision of the corridors and dispensing modules is to provide a system which may be modular and assembled in any manner dictated by the site. The site is prepared by digging appropriate ditches and providing gravel for the placement of the various modular parts.

As shown in FIG. 1, first outlet line 28 of tank 12 is fed into dispenser fuel line 86. Fuel outlet line 28' of tank 12' is fed into dispenser fuel line 87. These lines are supported on the walls of the corridors but are readily available for visual inspection. A canopy is indicated in phantom lines by reference character 84.

Figure 10:
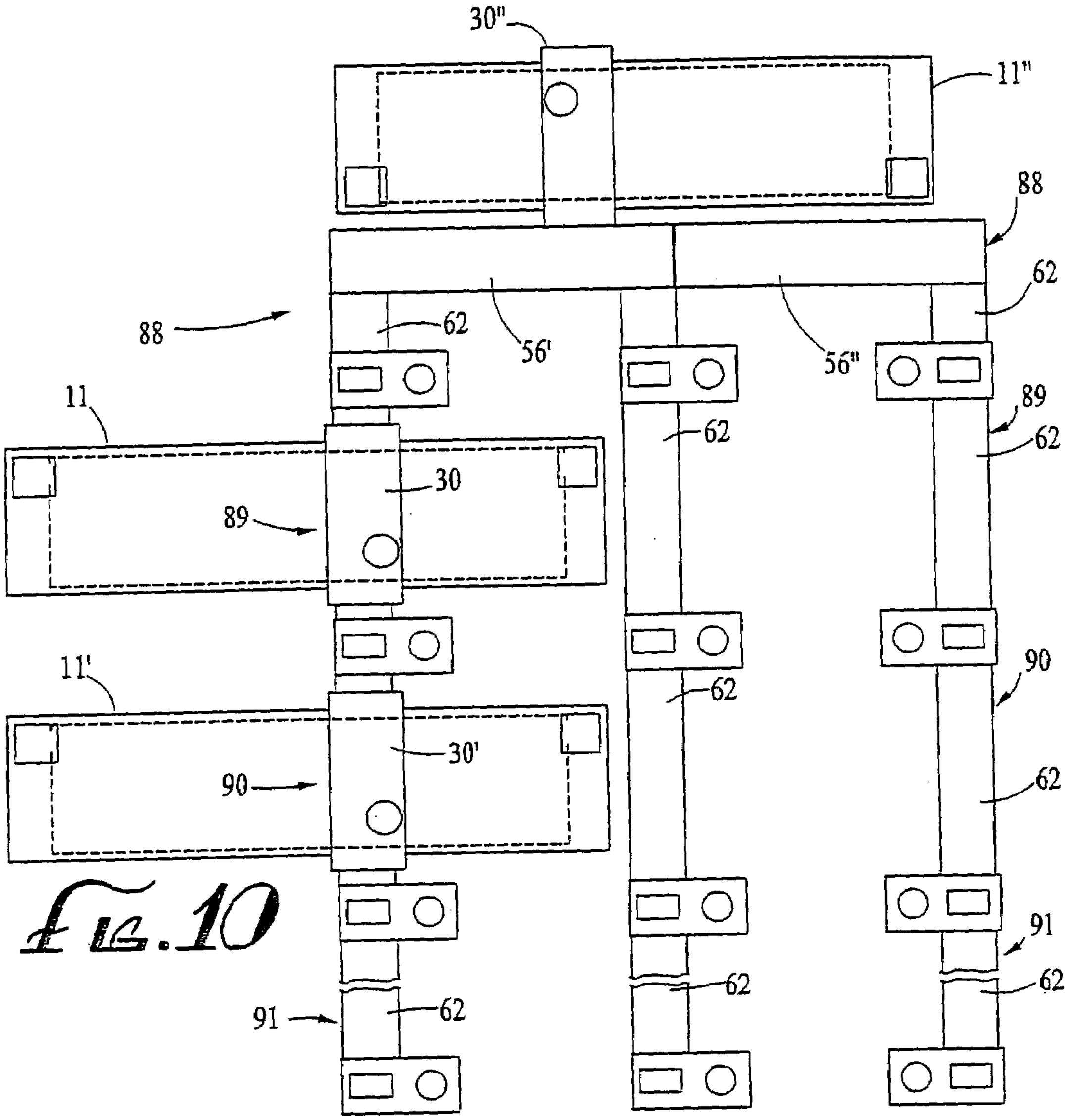
FIG. 10 is an alternate schematic view of a modular fuel dispensing and containment system of the present invention.

As shown in FIG. 10, the modular parts may be assembled in numerous different ways. In FIG. 10, three separate reinforced concrete vaults are shown, indicated by reference characters 11, 11', and 11". Vaults 11 and 11' can be located under the drive-through areas 88, 89, 90 and 91, as shown in FIG. 10. The piping interconnect corridor 56' is open at both ends and interconnect corridor 56" is open at one end.

An important feature of the present invention is the ability to provide air circulation through a single interconnected volume. That is, air can enter or exit at reference characters 82 and exit or enter at reference character 83 of FIG. 1 at opening 33 of FIG. 4 and turbine corridor 30. The entire volume includes the interior of each dispenser module 72 and 72', piping corridor 62, including piping interconnecting corridor 56, as well as the two turbine corridors 30 and 30' as shown in FIG. 1. This same volume is large enough to be entered by service personnel to physically inspect all piping. Similarly, the vaults can be provided with sleeves for air ducts, fire foam, sprinklers, lighting connections, and camera connections.

Once the system is designed and the concrete parts fabricated, the system can be installed in far less time than the conventional buried underground tanks. The possibility of fuel leaking from the tanks or the piping into the ground is essentially nil and, thus, potential savings are available because of the lack of need to contribute to a cleanup fund.

The turbine corridor 30, the piping interconnect corridor 56, and the piping corridor 62 can be connected to prior art tanks contained in underground vaults. The advantages of visual inspection and necessary repair and the ease of assembly do not require the specific tank and vault shown in FIGS. 1, 2, and 3.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A modular fuel dispensing and containment assembly for storing fuel in at least one fuel tank and pumping the fuel to a plurality of fuel dispensers at locations remote from the at least one fuel tank, said assembly comprising:

a vault located underground, said vault having a floor, end walls, side walls, a top supporting a lid, and an interior, said vault being fluid tight and said floor, end walls, side walls and lid having exposed inner surfaces;

a fuel tank held within said vault, said fuel tank being separated from said exposed inner surfaces, said fuel tank having a fuel filling line and a fuel outlet line, said fuel tank being separated from at least one of said end walls and side walls a sufficient distance to permit service personnel to enter an interior of said vault for inspection purposes;

a turbine corridor positioned with a bottom above said lid of said vault, said turbine corridor having an interior turbine corridor passageway leading from an area over said fuel tank where said fuel filling line and said fuel outlet line communicate with said fuel tank, said turbine corridor also being positioned underground and at least one of said side and end walls of said turbine corridor being open at at least one connection passageway for connection to at least one piping corridor and said turbine corridor passageway being sufficiently large for service personnel to enter said turbine corridor passageway;

a plurality of piping corridors at least one of which being sealingly affixed onto said connection passageway of said turbine corridor, said piping corridor having a floor, side walls forming a piping corridor passageway, a supply end sealed to said connection passageway of said turbine corridor, an exit end and being both underground and fluid tight and said piping corridor passageway being sufficiently large for service personnel to enter, said piping corridor having an opening at said supply end and at said exit end;

a dispensing module sealingly affixed onto one of said piping corridors, said dispensing module having a floor, side walls, end walls and a cover, said dispensing module being fluid tight and said side walls of said dispensing module being underground being accessible through a dispensing module passageway and said dispensing module passageway being sufficiently large to permit the entry of service personnel, said piping corridor passageway, said dispensing module passageway and said turbine corridor passageway forming a single interconnected air volume;

means for passing air through said single interconnected air volume; and a fuel dispenser mounted above said dispensing module.

2. The module fuel dispensing and containment assembly of claim 1 wherein at least one of said piping corridors is a piping interconnect corridor affixed between said turbine corridor and a plurality of piping corridors.

3. The modular fuel dispensing and containment assembly of claim, 2 wherein said piping interconnect corridor is connected to said connection passageway of said turbine corridor on an input side of a first side wall of said interconnect corridor and a first and a second piping corridor are connected at a supply end to a first and a second opening located on an output side of a second side wall.

4. The modular fuel dispensing and containment assembly of claim 3 wherein said first and second piping corridors have an exit end and a first dispensing module is connected to the exit end of said first piping corridor and a second dispensing module is connected to the exit end of said second piping corridor.

5. The modular fuel dispensing and containment assembly of claim 1 wherein said fuel tank is spaced from at least one end wall of said vault, said at least one end wall being an inspection end wall spaced a sufficient distance to permit a person to enter said interior of said vault and said vault has at least one upwardly extending turret extending upwardly from said lid adjacent said inspection end wall of said vault, said upwardly extending turret having an interior pedestrian rated access passageway leading into the interior of said vault, said upwardly extending turret having an upper opening about at a ground level.

6. The modular fuel dispensing and containment assembly of claim 5 wherein both end walls of said vault are inspection end walls and both inspection end walls have an upwardly extending turret extending upwardly from said lid.

7. The modular fuel dispensing and containment assembly of claim 1 wherein said assembly includes an air passageway in at least one dispensing module and an air passageway in at least one turbine corridor and includes means for passing air along a continuous air passageway from one of said air passageways and passing air out of the other air passageway.

8. The modular fuel dispensing and containment assembly of claim 1 wherein said lid of said vault has three parts, a first lid extending from a first end wall in the direction of a second end wall to a first lid inner end, a bottom of said turbine corridor contacting said first lid inner end on a first side of said bottom of said turbine corridor and said bottom extending to a second side of said bottom of turbine corridor, and a second lid extending from an interior end contacting said second side of said bottom of said turbine corridor to an exterior end contacting said second end wall.

9. The modular fuel dispensing and containment assembly of claim 1 wherein said assembly includes a plurality of vaults, fuel tanks and turbine corridors.

10. A modular fuel dispensing and containment assembly for storing fuel in at least one fuel tank and pumping the fuel to a plurality of fuel dispensers at locations remote from the at least one fuel tank, said assembly comprising:

a vault located underground, said vault having a floor, end walls, sidewalls, a lid, and an interior passageway, said vault being fluid tight and said floor, end walls, side walls, and lid having exposed inner surfaces;

a fuel tank held within said vault, said fuel tank being separated from said exposed inner surfaces, said fuel tank having a fuel filling line and a fuel outlet line, said fuel tank being separated from at least one of said end walls and side walls a sufficient distance to permit service personnel to enter said interior passageway of said vault for inspection purposes;

a plurality of piping corridors each having an interior passageway containing at least one fuel outlet line said piping corridor having a floor, side walls, a supply end, an exit end and being both underground and fluid tight and said interior passageway being sufficiently large for service personnel to enter, said piping corridor having an opening at said supply end and at said exit end;

a dispensing module sealingly affixed onto said exit end of one of said piping corridors, said dispensing module having a floor, sidewalls, end walls and a cover, said dispensing module being fluid tight and said side walls of said dispensing module being underground and said dispensing module having an interior passageway sufficiently large to permit the entry of service personnel, the interior passageways of said piping corridors and said dispensing module forming a single interconnected air volume and a single passageway leading from one end at said interior passageway of said piping corridor to a second end at said interior passageway of said dispensing module;

means for passing air from one end of said single interconnected air volume to the second end; and a fuel dispenser mounted above said dispensing module.

11. The modular fuel dispensing and containment assembly of claim 10 wherein said dispensing module has a pedestrian rated access door in said cover of said dispensing module whereby service personnel can enter the interior passageway of said dispensing module for servicing or inspection of piping and electrical circuit elements located below said cover of said dispensing module.

12. A module fuel dispensing and containment assembly for conveying fuel from at least one fuel tank having an upwardly extending turbine collar, said fuel tank being confined in an underground vault having a lid and transporting the fuel to a plurality of fuel dispensers at locations remote from the at least one fuel tank, said assembly comprising:

a turbine corridor forming an interior turbine corridor/passageway and positioned with a bottom contacting said lid of said vault, said turbine corridor also being positioned underground and having a bottom floor with a tank access opening sealingly connected to the turbine collar of said fuel tank in a fluid tight manner and at least one of said side and end walls of said turbine corridor/passageway being open at a connection passageway for connection to a piping corridor and said turbine corridor being sufficiently large for service personnel to enter an interior of said turbine corridor/passageway;

a plurality of piping corridors at least one of which being sealingly affixed onto said connection passageway of said turbine corridor, said piping corridor having a floor, side walls forming a piping corridor/passageway, a supply end sealed to said connection passageway of said turbine corridor, an exit end and being both underground and fluid tight and said piping corridor/passageway being sufficiently large for service personnel to enter, said piping corridor having an opening at said supply end and at said exit end;

a dispensing module sealingly affixed onto said exit end of one of said piping corridors, said dispensing module having a floor, side walls, end walls and a cover forming a dispensing module passageway, said dispensing module being fluid tight and said side walls of said dispensing module being underground and said dispensing module passageway being sufficiently large to permit the entry of service personnel, the interior of said turbine corridor, said piping and said dispensing module passageway and said turbine corridor/passageway forming a single interconnected air volume;

means for passing air through said single interconnected air volume;

a fuel dispenser mounted above said dispensing module; and piping connecting said fuel dispenser to said at least one fuel tank.

13. A fuel dispensing and containment assembly having a fuel tank and piping for conveying fuel to a fuel dispenser, said fuel dispenser being at a location remote from said fuel tank wherein the improvement comprises:

a fuel tank vault containing at least one fuel tank;

fuel piping leading from said at least one fuel tank and passing out of said fuel tank and passing out of said fuel tank vault;

a dispensing module vault positioned below a fuel dispenser, said piping leading into dispensing vault and said dispensing module containing no fuel tank, said dispensing module being of sufficient size to permit the entry of personnel into an inner space of said dispensing module, said said dispensing module having pedestrian access with an entryway in proximity to the said dispensing module for providing access to the inner space of said dispensing module without the necessity of entering the fuel tank vault whereby personnel can enter the inner space below a fuel dispenser to inspect or service any piping associated with said dispenser.

14. The fuel dispensing and containment assembly of claim 13 said fuel piping passing out of said fuel tank vault leads into a corridor adjacent said fuel tank vault and passing into said dispensing module which provides an air flow passageway within said corridor from an interior of said corridor to said inner space of said dispensing module.

15. The fuel dispensing and containment assembly of claim 13 wherein said fuel dispenser is supported on a cover sealed over a top of said dispensing module and said cover has a pedestrian access door formed therein.

16. The fuel dispensing and containment assembly of claim 13 further including a turbine corridor connected to said fuel tank vault and containing an interior turbine corridor passageway and said interior turbine corridor passageway containing fuel piping, at least one piping corridor having a corridor interior volume, said corridor interior volume being connected to the interior turbine corridor passageway of said turbine corridor and said corridor interior volume containing fuel piping and said piping corridor being connected to said dispensing module so that the corridor interior volume is connected to said inner space of said dispensing module.

* * * * *